Oct. 2, 1934.  H. D. ALLEN  1,975,442
GYROSCOPIC INSTRUMENT
Filed Dec. 14, 1931   2 Sheets-Sheet 1
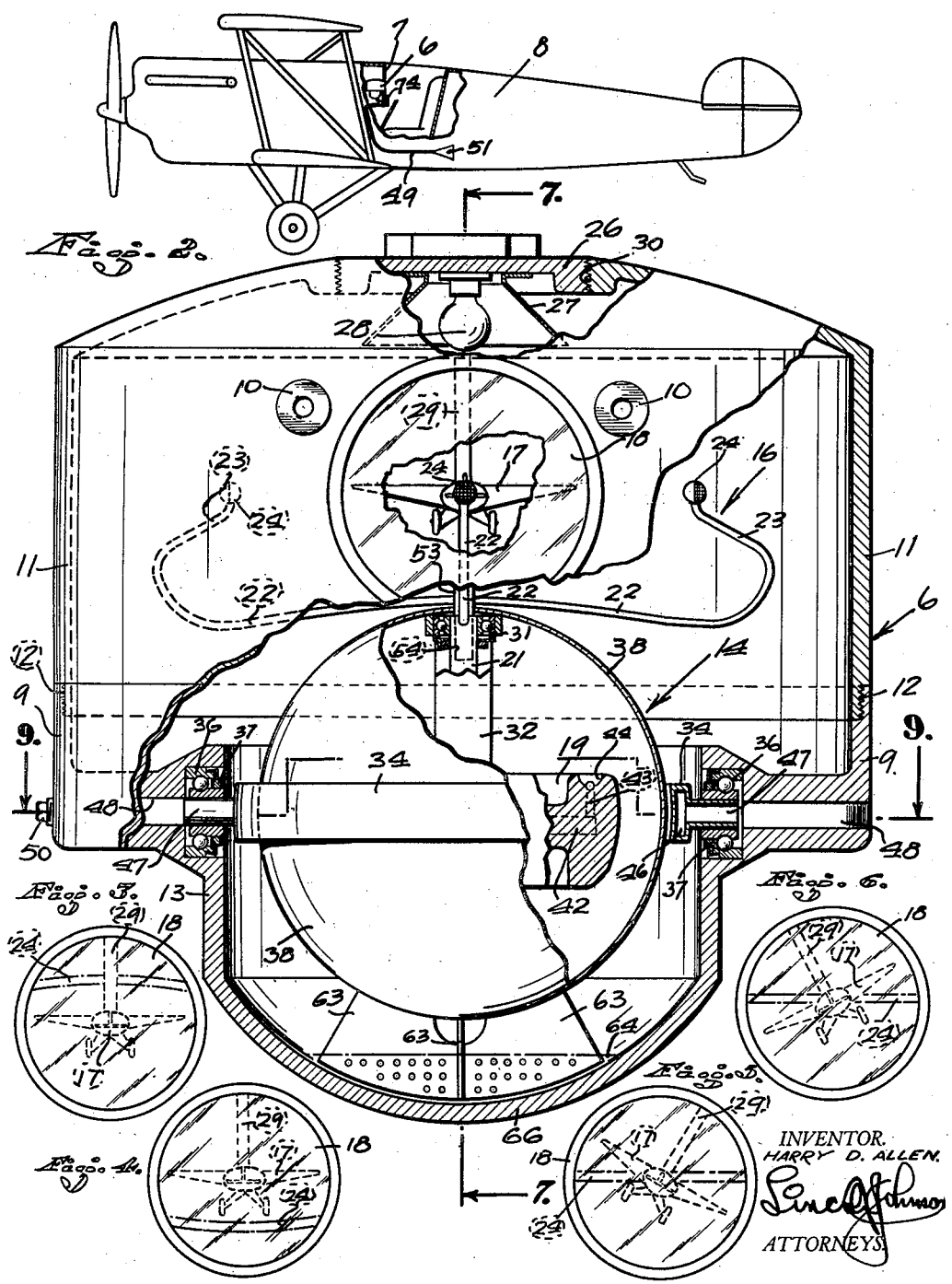
INVENTOR.
HARRY D. ALLEN.
ATTORNEYS

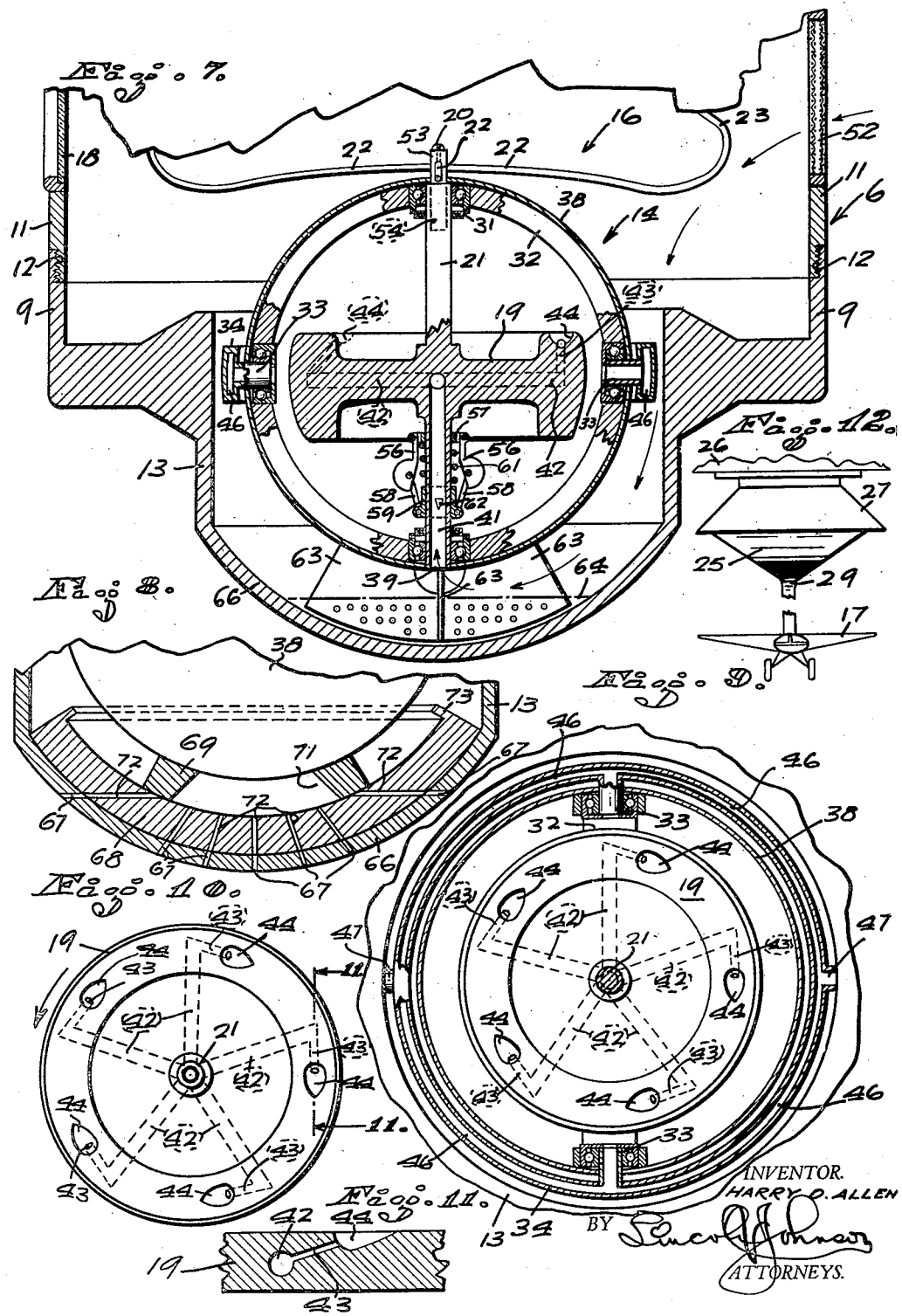

Patented Oct. 2, 1934

1,975,442

UNITED STATES PATENT OFFICE 1,975,442

GYROSCOPIC INSTRUMENT

Harry D. Allen, Haywards, Calif.

Application December 14, 1931, Serial No. 580,858

7 Claims. (Cl. 33—204)

This invention relates to gyroscopic instruments, and particularly to gyroscopic horizon indicators for aircraft.

An object of the invention is to utilize a universally mounted spinning mass for rotating a plurality of indicator elements, so that the latter form a substantially uninterrupted artificial horizon line appearing adjacent an image or silhouette of an aircraft as viewed through a transparent dial of an instrument, the spinning mass preferably consisting of an air driven rotor, supported on gimbal rings, so that its axis tends to remain in a position originally set, means being provided to correct variations due to precession, so that the rotary horizon will continuously indicate the natural horizon.

Another object of the invention is to provide a novel air driven rotor for gyroscopes, by inclosing the rotor in a casing through which an airflow is created, and by conducting the airflow through a system of angular passages in the rotor so arranged that the force of the airflow exerts a turning moment on the rotor and imparts rotation thereto.

Other objects and advantages are to provide a gyroscopic instrument that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein,

Fig. 1 is a side view of an airplane, the fuselage of which is partly broken away to show the arrangement of my gyroscopic instrument in place.

Fig. 2 is a front view of my gyroscopic instrument, the housing being partly in section, to expose the rotating elements of the instrument, part of the gyroscope casing, and rotor being also partly broken away to show the air passages and the mounting of the gyroscope.

Fig. 3 is a front view of the dial of my instrument showing the position of the horizon indicator during descent of the aircraft.

Fig. 4 is a front view of the dial and the horizon indicator as it appears during a climbing attitude of the aircraft.

Fig. 5 is a front view of the dial and the indicator during a "right bank" of the aircraft.

Fig. 6 is a front view of the dial and the indicator during a "left bank" of the aircraft.

Fig. 7 is a sectional view of my instrument, the section being taken on the line 7—7 of Fig. 2, and part of the top of the instrument being broken away.

Fig. 8 is a sectional view of a modified arrangement of a precession dampener for my gyroscope.

Fig. 9 is a cross sectional view of the instrument, the section being taken on the line 9—9 of Fig. 2.

Fig. 10 is a detail plane view of the rotor of my gyroscope.

Fig. 11 is a sectional view of an air nozzle passage in the gyroscopic rotor of my invention, the section being taken on the line 11—11 of Fig. 10.

Fig. 12 is a fragmental detail of the reflector showing a supporting bar mounted thereon.

The most important of the senses of an aircraft pilot which are affected by the position of the aircraft, are his eyes, which usually use the natural horizon as a reference. If poor visibility prevents the use of the eyes to observe the natural horizon, it has been found that the other senses of the pilot cannot cope with the problem of defining the horizontal. In complicated maneuvers and blind flying, therefore, the pilot's senses fail to help him. Hence a readily discernible, accurate artificial horizon is an essential aid in blind flying.

In providing an artificial horizon, as an aid to flying, I made use of a housing 6 mounted in the usual manner on the instrument board 7 of an airplane 8, by means of pads or bosses 10 on the outside of the front of the said casing. While in this illustration I show my instrument on an airplane, it is to be understood that my instrument can be used on aircraft of any type.

The housing 6 is made of two cylindrical sections 9 and 11, threadedly united at 12 in end to end relation. In the lower section 9 is formed a receptacle 13 of reduced diameter, in which is mounted a gyroscope 14. On the gyroscope 14 is mounted a rotary horizon indicator 16, the level of which is normally in the plane of a silhouette or image of an aircraft such as an airplane 17 stationarily held in the upper section 11. The upper section 11 has a transparent dial or sight 18 on its front between the pads 10, through which the relative position of the horizon indicator and the airplane image 17 can be observed by the pilot.

The gyroscope 14 includes a pendulously supported rotor 19 in the shaft 21 of which are secured a plurality of radially extended arms 22 of the rotary indicator 16. The inner ends of the arms 22 are held in place by a set screw 20. Each arm 22 is arched downwardly and then rebent, and it terminates in an upwardly extended portion 23. At the free end of each arm 22 is a ball 24. The balls 24 are equidistant from the axis of rotation of the rotor shaft 21. The image of the airplane 17 is centered on the axis of rotation of the rotor shaft 21 and is so arranged that it is viewed from the tail, looking through the sight 18.

In the top of the upper housing section 11 is threaded a bracket 26 to support a downwardly directed reflector 27 in which is held an electric light bulb 28 suitably connected to a source of electricity. A bar 29 depends from the reflector 27. The airplane 17, or other aircraft model, is attached to the lower end of the bar 29 and is supported thereon in stationary position relatively to the housing 6. The bar 29 is bent toward the dial or sight 18 at its upper end and is widened into a flared flange 25 fixed onto the front edge of the reflector 27 in such position that it reflects its shadow toward the front and to the sides of the housing 6 so that its shadow will not disturb the illuminated artificial horizon.

The reflector 27 is so tapered that the beam of light reflected therefrom illuminates only the inner halves of the balls 24. In other words only that half of each ball 24 is illuminated which faces toward the center of rotation of the horizon unit, and this surface is also coated with a phosphor paint or the like, to be visible even in dark. The other half of each ball 24 is painted or finished of a dull color or surface to blend into the back ground. The back ground is formed by the inner surface of the upper section 11, which is painted or finished the same way as the outer halves of the balls 24. For instance, in the present illustration the outer halves of the balls 24 are indicated as painted black, therefore the inner surface of the housing section 11 is also finished black. When the instrument is in operation and the rotor 19 of the gyroscope 14 is rotated, the indicator 16 rotates therewith. As the balls 24 are moved around the airplane 17, the black halves of the same are always facing outwardly from the orbit of their movement. Hence the balls 24 are visible only on the half of their path around the nose of the airplane 17 where the shiny halves thereof face toward sight 18. It is to be noted that the balls 24 travelling between the tail of the airplane 17 and the sight 18 do not obstruct the view of the horizon at the nose of the airplane 17, because they operate similarly to a high speed shutter. Consequently a substantially uninterrupted illuminated horizon line appears in front of the nose of the airplane 17 in a position that very closely resembles the appearance of the natural horizon, in a natural position. During the pitching movement of the aircraft the horizon appears slightly curved as shown in Figs. 3 and 4.

The threaded aperture 30 in the top of the upper housing section 11 into which the bracket 26 is threaded, is of sufficiently large diameter to permit the removal of the reflector 27, and of the airplane 17 therethrough, thereby obviating the necessity of separating the entire housing 6 for minor repairs or replacement of light bulbs and the like.

The gyroscope 14 is preferably air driven. The rotor 19 has its shaft 21 journaled at its opposite ends in ball bearings 31 in a vertical gimbal ring 32, which latter in turn is supported for oscillation around a horizontal axis on ball bearings and on journal pins 33 on an outer normally horizontal gimbal ring 34. The gimbal ring 34 is journal for oscillation around a fore and aft axis in ball bearings 36 in the walls of the receptacle 13 of the lower housing section 9. It is to be noted that the ball bearings of the gimbal journals are air-tight, by providing suitable packings, such as at 37 for sealing the bearings against leakage.

On the inner gimbal ring 32 is fixed an air-tight hollow, spherical casing 38, which freely oscillates with the gimbal ring 32 within the outer gimbal ring 34. The casing 38 may be made in two semi-spherical sections suitably fixed onto the gimbal ring 32, and sealed at its joints therewith to inclose an air-tight compartment of space around the rotor 19.

The casing 38 has an air inlet 39 at the lower end of the rotor shaft 21, and an air outlet, at least, through one of the journal pins 33. In the present illustration opposed, balanced outlets are formed at both journal pins 33. The lower half of the rotor shaft 21 is hollow and forms a conduit 41 for airflow from the inlet 39 to the center of the interior of the rotor 19. A plurality of rotor vanes are formed in the rotor 19 by radial passages 42 extending from the conduit 41 outwardly. Each passage 42 terminates in a reduced angular passage 43 at its outer end. The passages 43 are also substantially tangential to the same theoretical circle, concentric with the rotor 19, so that when the airflow through the passages 42 is deflected the momentum of the air jet in each passage is transferred to the rotor tangentially to exert a turning moment on the rotor and cause the same to rotate. The rotor is rotated in a direction opposite to the discharge of the air jets from the reduced passages 43, and this direction is contra-clockwise viewing Figs. 10 and 11. This particular vane arrangement also balances the rotor so as to resist precession from any cause.

In order to prevent any disturbing action of the air jets at the discharge of the passages 43, each passage 43 is terminated in a stream lined recess 44 on the top face of the rotor 19. Each recess 44 is pointed and tapered away from the end of the passage 43, or in other words, each passage 43 discharges into the wider bottom of a recess tapered and stream lined in continuation of the passage 43, so that the air jet can be discharged without any change of direction or further action on the rotor 19.

In order to create the required air flow through the rotor 19, the air is drawn out of the casing 38 through the outlets in the pins 33. The outer gimbal ring 34 is hollow all around to form balanced conduits 46 extending from the outlets in the journals 33 to the respective hollow journal pins 47 of the outer gimbal 34. The lower housing section 9 has a bore 48 therein in continuation of each pin 47. Each bore 48 is internally threaded at its outer end to receive the end of a pipe 49 therein. The pipe 49 leads to a suitable Venturi tube 51 outside the fuselage of the airplane 8, so arranged that the airflow along the fuselage draws air out through the Venturi tube 51. Thus the air is drawn through the pipe 49, bore 48, pin 47 and conduits 46 out of the casing 38. The suction created in the casing 38 draws the air in through the passages 42 and 43, from the shaft conduit 41 and inlet 39. The inlet 39 communicates with the interior of the housing 6, which latter has a screened air inlet 52 thereon to admit outside air into the said housing 6. Only one of the bores 48 is used at a time, the other can be closed by a suitable plug 50. Thus the instrument can be connected to a venturi on either side of the airplane.

The airflow created by the suction at the Venturi tube 51 produces forceful air jets through the passages 42 and 43, the momentum of which is converted into a turning moment on the rotor 19.

The central stem 53 of indicator 16, from which the arms 22 extend, is detachably fastened into a socket 54 in the upper end of the rotor shaft 21 to rotate with the latter.

In order to maintain the rotor speed at a constant rate, a governor is provided on the lower portion of the rotor shaft 21. A pair of weighted levers 56 are pivoted on a collar 57 fixed on the shaft 21 below the rotor 19. The levers 56 are along opposite sides of the shaft 21 and are adapted to swing outwardly around their respective fulcrums in accordance with the centrifugal force exerted thereon, which latter of course, is dependent on the speed of the shaft rotation. A link 58 pivoted at both ends, connects the free end of each lever 41 to a sliding collar 59 on the shaft 21. A coil spring 61 is disposed around the shaft 21 between the collars 57 and 59 to urge the latter downwardly, so that the collar 59 is held in normal position until the normal rotor speed is exceeded. In case of excessive speed, the centrifugal force on the levers 41 gradually overcomes the tension of the spring 61 and pulls the collar 59 upwardly. The collar 59 normally covers a triangular, downwardly pointed vent 62 in the side of the hollow portion of the shaft 21. The vent 62 is gradually uncovered by the collar 59 in accordance with the excessive speed and bleeds some air directly into the space within the casing 38. The vacuum in the casing 38 is thus partially broken down, and the velocity and force of the air jets through the passages 42 and 43 is correspondingly reduced thereby to reduce the speed of the rotor 19 to normal. At normal speed the collar 59 covers the entire vent 62 and prevents the escape of air therethrough.

The oscillation of the gyroscope 14 should be dampened, and in addition to the balancing tendency of the air jets through the passages 42 and 43, provision is made therein to overcome irregular oscillation due to precession from various causes and forces. For this purpose dampeners or balancers are provided to urge the gyroscope 14 to vertical position.

The dampener shown in Figs. 2 and 7 includes vanes 63 extended from the bottom of the casing 38. The vanes 63 depend into fluid 64 contained in the bottom 66 of the receptacle 13. The bottom 66 is concave and curved, and lower edges of the vanes 63 are also curved of the same radius, to slide along the concave side of the bottom 66. The vanes 63 are suitably perforated to prevent excessive resistance or action of the weight of fluid on the vanes 63. The upper corner of intersection of the vanes 63 is cut away to leave the air inlet 39 unobstructed. As the housing 6 tilts with the aircraft the pendulously supported gyroscope remains angularly fixed in space while the aircraft moves about it to maintain the artificial horizon horizontal. The resistance offered by the fluid 64 to such oscillation of the vanes 63 with the gyroscope 14 renders the relative movement of the horizon smooth. Furthermore, the changing of the weight of the fluid on the respective sides of the vanes 63 exerts a force on the gyroscope 14 opposite to that of the precession force at such oscillations, thereby urging the gyroscope to find its true vertical axis of rotation at all times.

The maximum tilting of the gyroscope 14 is also limited by the abutment of the lower corners of the vanes 63 against the corners of the bottom 66. This prevents the gyroscope 14 to topple over in case of excessive tilting of the airplane. In other words the vanes 63 will abut against the sides of the receptacle 13 before the arms 22 of the indicator 16 could hit against sides of the upper housing section 11.

Any other suitable dampener or other device may be used to counteract precession or excessive oscillation. For instance in Fig. 8 I show an air-operated dampener. In this structure the air inlet into the housing 6 is through a plurality of apertures 67 through the bottom 66 of the receptacle 13. A spherical seat 68 is secured on the bottom 66, on which seat is movable a swinging spherical sliding valve 69, which latter is suitably mounted on the bottom of the casing 38. The valve 69 has an upwardly tapered aperture 71 therethrough communicating with the air inlet 39. The seat 68 has passages 72 therethrough in alignment with the apertures 67. The apertures 67 and passages 72 are formed in a fan-like arrangement to extend at various increasing angles to the sides of the tapered valve aperture 71. As the gyroscope 14 oscillates the valve 69 slides over the valve seat 68 opening and closing various passages 72. The jets of air drawn in through the uncovered passages 72 is so directed against the respective walls of the valve aperture 71, that it counteracts oscillation and precession and exerts a balancing force on the gyroscope 14 to urge the same toward its vertical spinning axis. A stop flange 73 around the edge of the valve seat 68 limits the maximum swing of the gyroscope to such a degree as to prevent the said indicator arms 22 to hit the sides of the upper housing section 11.

The instrument may be rendered operative and inoperative by merely turning a control valve, such as a petcock 74 (Fig. 1) on the instrument board 7, the petcock being interconnected in the pipe 49 to control the flow through the latter. By closing the petcock 74 the Venturi tube 51 is disconnected from the instrument. The instrument can be readily rendered operative by opening the petcock 74 thereby communicating the Venturi tube 51 with the casing 38 and permitting the former to draw air through the latter and rotate the rotor 19 as heretofore set forth.

Having thus described this invention, what I claim and desire to secure by Letters Patent is:

1. In a gyroscopic instrument for aircraft, a frame, a gyro rotor having a substantially vertical spin axis, a gimbal mounting for mounting said rotor for universal movement in said frame, said mounting including an inner gimbal ring, there being a continuous conduit from the periphery of the rotor, thru its axle and said gimbal ring whereby the rotor may be spun by reaction, a casing on said inner ring enclosing said rotor, means to create a flow of air thru said conduits to draw air through the said casing to maintain a less than atmospheric air pressure therein, said conduit in the rotor terminating in a plurality of radial passages to so direct the airflow in the rotor as to exert a turning moment on the rotor, said frame being formed as a housing; an indicator connected to and rotated by the rotor; said housing having a sight opening opposite said indicator and having an air inlet and outlet thereon; a receptacle in the housing below the casing and containing fluid; and a plurality of dampener fins extended from the casing into the said fluid.

2. In a gyroscopic horizon indicator, the combination with an oscillatably suspended gyroscope, and the image of an aircraft held in operative relation thereto, of a horizon indicator comprising a plurality of arms connected to the rotor of the gyroscope to rotate with the same; and means on said arms spaced from and aligned with said image to form an artificial horizon of substantially uninterrupted appearance normally at the level of said image, said arms being movable with the gyroscope to indicate the attitude of the aircraft relatively to the real horizon by the displacement of the gyroscope relatively to the image.

3. In a gyroscopic horizon indicator, the combination with an oscillatably suspended gyroscope and the image of an aircraft held in operative relation thereto, of a horizon indicator comprising a plurality of circumferentially spaced elements around the image, means to connect said elements to the gyroscope to rotate and oscillate with the latter; and a housing in which the said indicator is disposed; the sides of the elements facing outwardly from the aircraft image and the interior back-ground of the housing being finished to form a non-reflecting surface so as to render the said sides of the said elements invisible, the other sides of the said elements being visible to form a substantially uninterrupted horizon line when the elements are moved around the air craft image.

4. In a gyroscopic horizon indicator, a housing, an aircraft simulating indicator held in the housing, a gyroscope pendulously suspended in the housing, a plurality of balls, means to support the balls in circumferentially spaced relation around the said aircraft model and to connect the balls to the gyroscope to be rotated as a unit by the rotor of the latter and to oscillate therewith; and means to illuminate the sides of the balls facing the aircraft model, the other sides of the balls and the interior of the housing being so finished as to render said last sides of the ball invisible.

5. The combination with an air driven gyroscope, of an air operated dampening mechanism comprising a dished seat having air inlet apertures therethrough arranged at gradually increasing angles from the center of the seat outwardly, a valve body on the gyroscope slidable on the said seat having a valve aperture therethrough to conduct air to the gyroscope from said inlet apertures, the valve aperture having inclined sides so related to said inlet apertures as to be acted upon by air jets from the latter to balance the gyroscope, as the valve is moved over the seat and covers and uncovers various inlet apertures.

6. In a gyroscopic instrument, the combination with a hollow inner and outer gimbal journaled for oscillation on a frame having air conduits thru the journals of the gimbals of a suction operated rotor journaled in the inner gimbal and having an air conduit formed thru the rotor in communication with the air conduit in the gimbal journals; a hollow closed spherical casing on the inner gimbal to provide a closed space around the rotor; means to create an air flow thru the rotor conduits and hollow gimbals to maintain negative air pressure within the casing, said conduit in the rotor terminating in a plurality of radial passages to so direct the air flow into the rotor as to exert a turning moment on the rotor; an indicator connected to and rotated by the rotor to form an artificial horizon; and an image of an aircraft supported in a fixed position on the frame and in operative relation to the indicator.

7. In a gyroscopic horizon indicator, the combination with an oscillatable suspended gyroscope; a stationary image of an aircraft; a horizon indicator connected to and spun by and with the gyroscope rotor to form an artificial horizon normally at the level of said image, said indicator being movable with the carrying craft to indicate relatively to said indicator the attitude of the carrying aircraft relative to the real horizon.

HARRY D. ALLEN.